(12) United States Patent
He (10) Patent No.: US 10,389,692 B2
(45) Date of Patent: Aug. 20, 2019

(54) PEER-TO-PEER DEVICE MANAGEMENT, MONITOR AND CONTROL

(75) Inventor: Jianping He, Edison, NJ (US)

(73) Assignee: Jianping He

(*) Notice: Subject to any disclaimer, the term of this patent is extended or adjusted under 35 U.S.C. 154(b) by 1057 days.

(21) Appl. No.: 13/290,083

(22) Filed: Nov. 5, 2011

(65) Prior Publication Data

US 2013/0117565 A1    May 9, 2013

(51) Int. Cl.
*H04L 9/28* (2006.01)
*H04L 29/06* (2006.01)
*G06F 9/445* (2018.01)

(52) U.S. Cl.
CPC ........ *H04L 63/061* (2013.01); *H04L 63/0435* (2013.01); *H04L 63/20* (2013.01)

(58) Field of Classification Search
CPC ...... H04W 4/005; H04W 4/16; H04L 67/025; H04L 67/104; H04L 63/061; H04L 63/0435; H04L 63/20
USPC ........................................................ 713/168
See application file for complete search history.

(56) References Cited

U.S. PATENT DOCUMENTS

| | | | |
|---|---|---|---|
| 6,970,917 B1 | 11/2005 | Kushwaha et al. | |
| 7,184,554 B2 | 2/2007 | Freese | |
| 7,194,526 B2 | 3/2007 | Kanemitsu | |
| 7,206,806 B2 * | 4/2007 | Pineau | H04L 29/06 709/203 |
| 7,234,063 B1 * | 6/2007 | Baugher | H04L 9/0833 380/259 |
| 7,343,408 B2 | 3/2008 | Kushwaha et al. | |
| 7,349,990 B2 | 3/2008 | Shell et al. | |
| 7,716,276 B1 | 5/2010 | Ren et al. | |
| 7,747,722 B2 | 6/2010 | Kim | |
| 7,805,606 B2 * | 9/2010 | Birger et al. | 713/168 |
| 7,849,135 B2 * | 12/2010 | Agrawal | G06Q 10/10 455/457 |
| 7,870,490 B2 | 1/2011 | Coles et al. | |
| 7,961,663 B2 * | 6/2011 | Lin | H04L 51/04 370/313 |
| 7,986,947 B2 | 7/2011 | Hamasaki et al. | |

(Continued)

OTHER PUBLICATIONS

Granville, Lisandro Zambenedetti, et al. "Managing computer networks using peer-to-peer technologies." IEEE Communications Magazine 43.10 (2005): 62-68. (Year: 2005).*

(Continued)

*Primary Examiner* — Michael Simitoski (57) ABSTRACT

The present invention provides a method and system for peer-to-peer device management, monitor and control. Communication devices connected by communication networks can manage, monitor and control each other; they can be in both managing-monitoring-controlling and managed-monitored-controlled roles. That is, a device A can manage, monitor and control a device B, and the device B can manage, monitor and control the device A. In one aspect, communication devices can send request messages comprising management, monitor and control commands to peers and receive response messages comprising results and statuses to the request messages from peers, and vice versa. In another aspect, communication devices can send notification messages to peers for management, monitor and control when their monitored contents or states meet predefined criteria, and vice versa.

4 Claims, 4 Drawing Sheets

(56) References Cited

U.S. PATENT DOCUMENTS

| | | | |
|---|---|---|---|
| 8,032,647 B2 | 10/2011 | Shon et al. | |
| 8,095,634 B2 | 1/2012 | Rao | |
| 8,117,257 B2 | 2/2012 | Kim | |
| 8,161,150 B2 | 4/2012 | Kim | |
| 8,332,517 B2* | 12/2012 | Russell | 709/226 |
| 2006/0015936 A1* | 1/2006 | Illowsky et al. | 726/18 |
| 2006/0194596 A1* | 8/2006 | Deng | H04L 51/04 455/466 |
| 2008/0091763 A1* | 4/2008 | Devonshire | G06F 9/548 709/201 |
| 2008/0115152 A1* | 5/2008 | Welingkar | H04L 67/34 719/322 |
| 2008/0209329 A1* | 8/2008 | DeFranco et al. | 715/733 |
| 2008/0276091 A1* | 11/2008 | Welin | H04L 67/104 713/170 |
| 2009/0265552 A1* | 10/2009 | Moshir et al. | 713/168 |
| 2010/0217994 A1* | 8/2010 | Ginter et al. | 713/176 |
| 2010/0303236 A1* | 12/2010 | Laaksonen et al. | 380/270 |
| 2012/0036552 A1* | 2/2012 | Dare | H04L 41/0253 726/1 |
| 2012/0246479 A1* | 9/2012 | Sutherland | H04L 41/046 713/168 |
| 2012/0258689 A1* | 10/2012 | Yang | H04M 1/57 455/411 |

OTHER PUBLICATIONS

McNamara, Gerard, and Yanyan Yang. "Creating a mobile P2P file sharing environment over Bluetooth." 2008 Third International Conference on Pervasive Computing and Applications. vol. 2. IEEE, 2008. (Year: 2008).*

Panisson, Andre, et al. "Designing the architecture of p2p-based network management systems." 11th IEEE Symposium on Computers and Communications (ISCC'06). IEEE, 2006. (Year: 2006).*

* cited by examiner

PEER-TO-PEER DEVICE MANAGEMENT, MONITOR AND CONTROL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

With the innovation and development of technology, more and more electronic devices have become part of people's daily lives. A person may have a number of communication devices such as smart phones, tablets, laptops, or personal computers. It is a challenging job for communication service providers, enterprise IT departments, and individual consumers to manage more and more devices.

Configuration, diagnosis, resource maintenance, health check, and security are the main tasks of device management, monitor and control. An example of configuration on a device is to select the proper language setting based on a user's preference. The analysis of call drops on a mobile phone is an example of diagnosis. An example of resource maintenance on a device is to manage files and applications regularly. The statistical report of cpu, memory, disk and process usages on a device is an example of health check. An example of security on a device is to setup proper passwords based on certain security policy.

Traditional device management, monitor and control systems are based on client-server model. A centralized server can manage, monitor and control a number of, such as hundreds, thousands or millions of, client devices. The client devices receive commands from the server and perform whatever actions the server asks for.

There are a few drawbacks for traditional device management, monitor and control approach. First, device management, monitor and control systems are mainly designed for communication service providers and enterprises, not for individual consumers. Second, due to the complexity to handle different devices, most of implementations and deployments of device management, monitor and control systems are very complicated, expensive, and unaffordable to individual consumers. Third, the client-server model in device management, monitor and control is a one-way management, monitor and control approach from a server to a client. The client cannot manage, monitor and control the server.

Therefore, there is a need to provide a cost-effective and flexible solution for individual consumers to manage, monitor and control their electronic assets.

BRIEF SUMMARY OF THE INVENTION

The present invention provides a method and system for peer-to-peer device management, monitor and control where communication devices connected by networks can manage, monitor and control each other. Contrast to traditional client-server based model in device management, monitor and control where each device can be in either managing-monitoring-controlling role, or managed-monitored-controlled role, but not both, communication devices in the present invention can be in both managing-monitoring-controlling role and managed-monitored-controlled role. That is, a device A can manage, monitor and control a device B, and the device B can manage, monitor and control the device A.

One aspect of the present invention is that communication devices can send request messages comprising device management, monitor and control commands to peers and receive response messages comprising results and statuses to the request messages from peers. Another aspect of the present invention is that communication devices can send notification messages to peers for device management, monitor and control when their monitored contents or states meet predefined criteria.

DETAILED DESCRIPTION OF THE INVENTION

Figure 1:
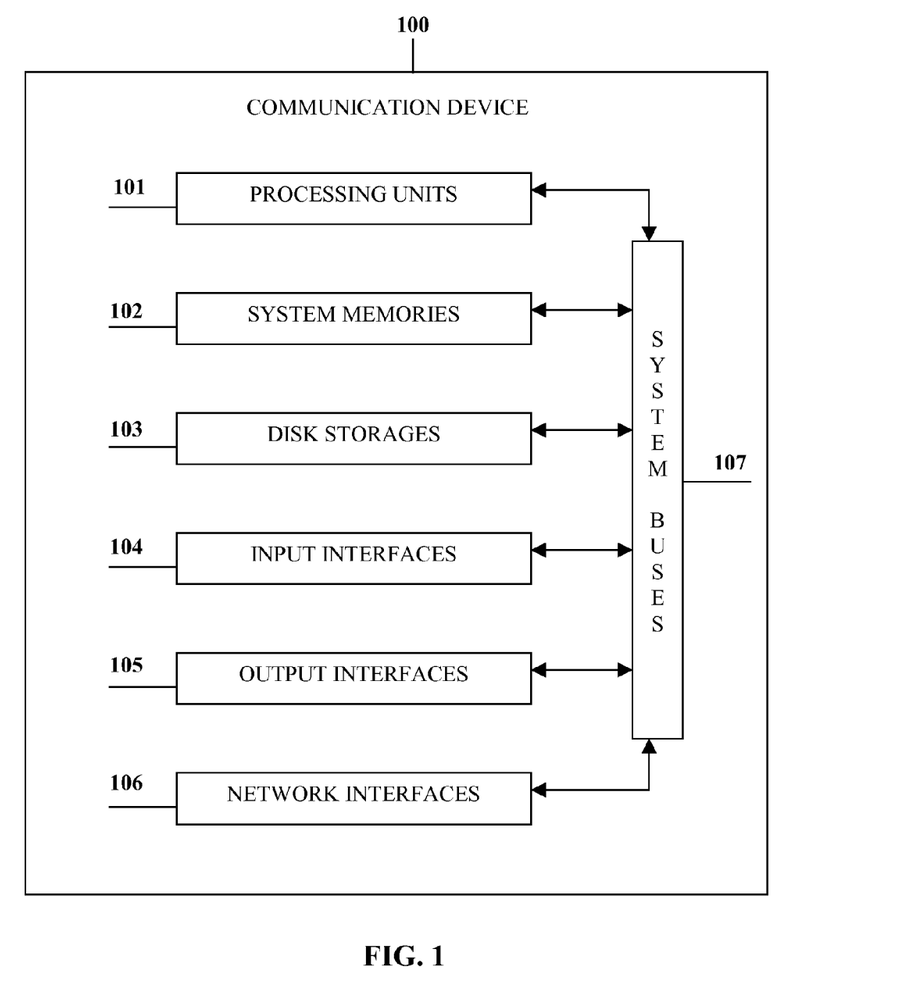
FIG. 1 illustrates a perspective architecture of a communication device, in accordance with one embodiment of the present invention.

FIG. 1 illustrates a perspective architecture of a communication device. In one embodiment, the communication device 100 comprises central processing units 101, system memories 102, disk storages 103, input interfaces 104, output interfaces 105, network interfaces 106, and system buses 107.

The central processing units 101 provide a means for executing executable programs and can be any types of microcontrollers, processors, microprocessors, or multiprocessors. The system memories 102 provide a means for storing executable programs such as a basic input/output system (BIOS), one or more operating systems, a plurality of firmware modules, and a plurality of software modules. The system memories 102 can be any combinations of random-access memory (RAM) and read-only memory (ROM). The disk storages 103 provide a means for storing programs, files and data, and can be any types of internal and external magnetic disks, optical disks, and the like.

The input interfaces 104 provide a means for transferring data into the communication device 100 through input components and/or devices (not shown) such as keyboard, keypad, touch-pad, touch screen, thumb-wheel, trackball, mouse, stylus, joystick, microphone, camera, sensor, etc. The output interfaces 105 provide a means for transferring data from the communication device 100 to output components and/or devices (not shown) such as screen, display, television, speaker, etc. The network interfaces 106 provide a means for transferring data between the communication device 100 and other communication devices (not shown) through communication networks (not shown) such as circuit-switched telephone networks and packet-switched data networks.

The system buses 107 provide a means for transferring data internally among the central processing units 101, the system memories 102, the disk storages 103, the input interfaces 104, the output interfaces 105, the network interfaces 106, and other components (not shown) of the communication device 100.

Figure 2:
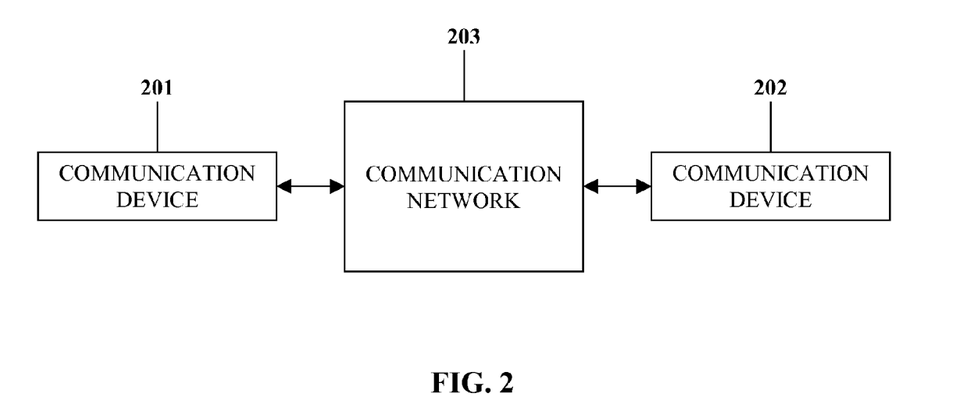
FIG. 2 illustrates a block diagram of two communication devices connected by a communication network, in accordance with one embodiment of the present invention.

Reference is now to FIG. 2, which illustrates a block diagram of a communication device 201 and another communication device 202 connected by a communication network 203. The communication network 203 provides a means for transporting messages between message senders and message receivers. The communication network 203 comprises one or more of satellite networks, wired networks, and wireless networks. Wired networks comprise one or more of internet, intranet, local area network (LAN) such as ethernet, wide area network (WAN) such as frame relay and asynchronous transfer mode (ATM), virtual private network (VPN), public switched telephone network (PSTN), and the like. Wireless networks comprise one or more of wireless personal area network (WPAN) such as bluetooth and near field communication (NFC), wireless local area network (WLAN) such as Wi-Fi, wireless wide area network (WWAN), wireless metropolitan area network (WMAN) such as worldwide interoperability for microwave access (WIMAX), long term evolution (LTE), cellular network such as global system for mobile communications (GSM), general packet radio service (GPRS), code division multiple access (CDMA), evolution-data optimized (EV-DO), enhanced data rates for GSM evolution (EDGE), digital enhanced cordless telecommunications (DECT), integrated digital enhanced network (IDEN), and the like.

The communication device 201 and the communication device 202 share the same architecture as the one denoted in FIG. 1. They communicate with each other through their network interfaces via the communication network 203.

Figure 3:
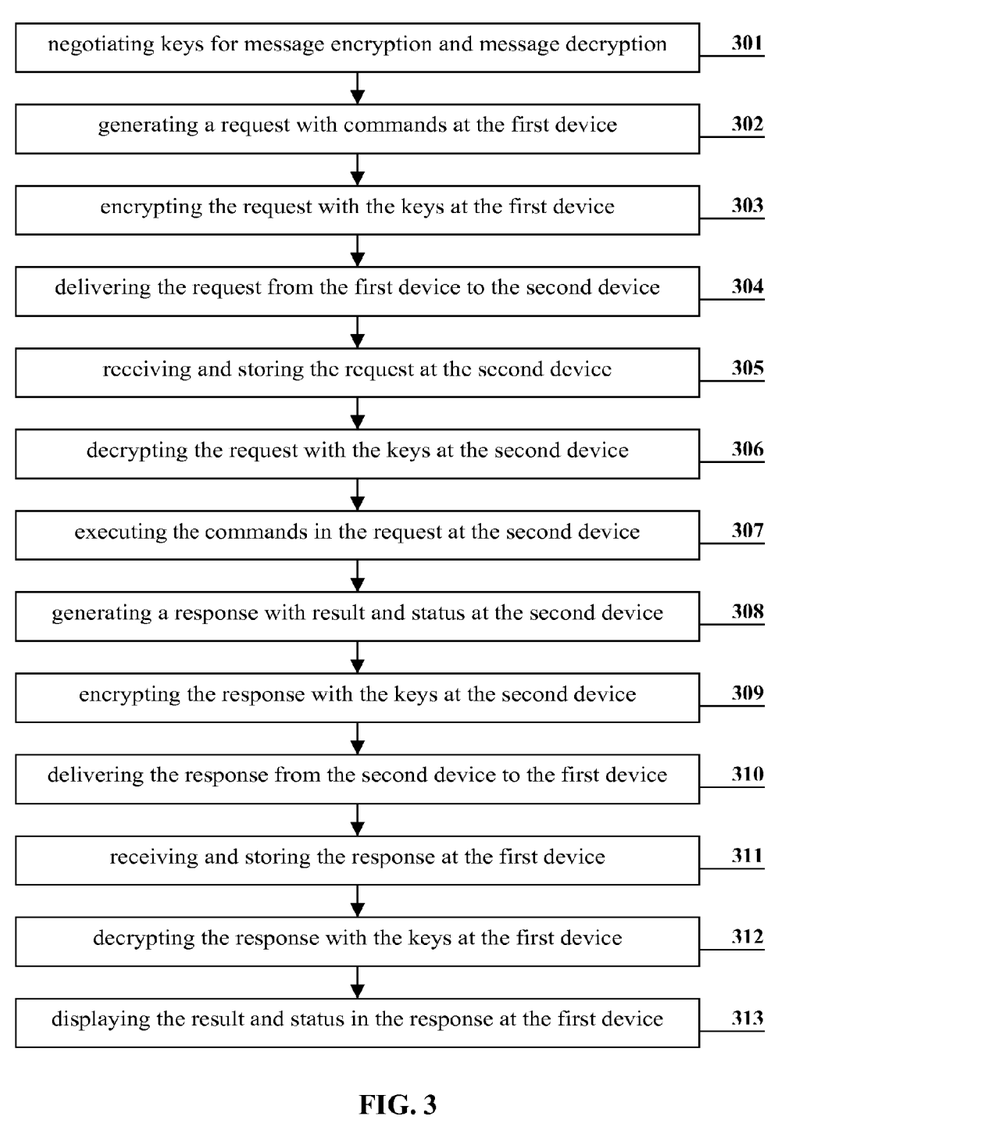
FIG. 3 illustrates a schematic block diagram of an exemplary request and response, in accordance with one embodiment of the present invention.

Reference is now to FIG. 3, which illustrates a schematic block diagram of an exemplary request and response. In one embodiment, the communication device 201 from FIG. 2 is denoted herein as the first device, and the communication device 202 from FIG. 2 is denoted herein as the second device. In the block 301, keys for message encryption and message decryption between the first device and the second device are negotiated and agreed by both devices, based on credentials such as public keys, private keys, and/or account names, passwords from the first device and/or the second device.

In the block 302, a request message with commands to manage, monitor and control the second device is generated at the first device. The request message may contain commands to retrieve or modify configurations, retrieve voice or data contents, perform security actions, start or stop hardware components, install or uninstall firmware modules and software modules, and the like. The request message is encrypted with the keys at the first device in the block 303, and then transported from the first device to the second device in the block 304 via the communication network 203.

The request message is received and stored in the block 305 and decrypted in the block 306 at the second device. In the block 307, the commands in the request message are executed by their corresponding components or modules (not shown) at the second device. A response message with the result and status to the request message is generated in the block 308 and encrypted with the keys in the block 309 at the second device. In the block 310, the response message is transported from the second device to the first device via the communication network 203.

The response message is received and stored in the block 311 and decrypted in the block 312 at the first device. In the block 313, the response message with result and status to the request message is displayed at the first device.

Figure 4:
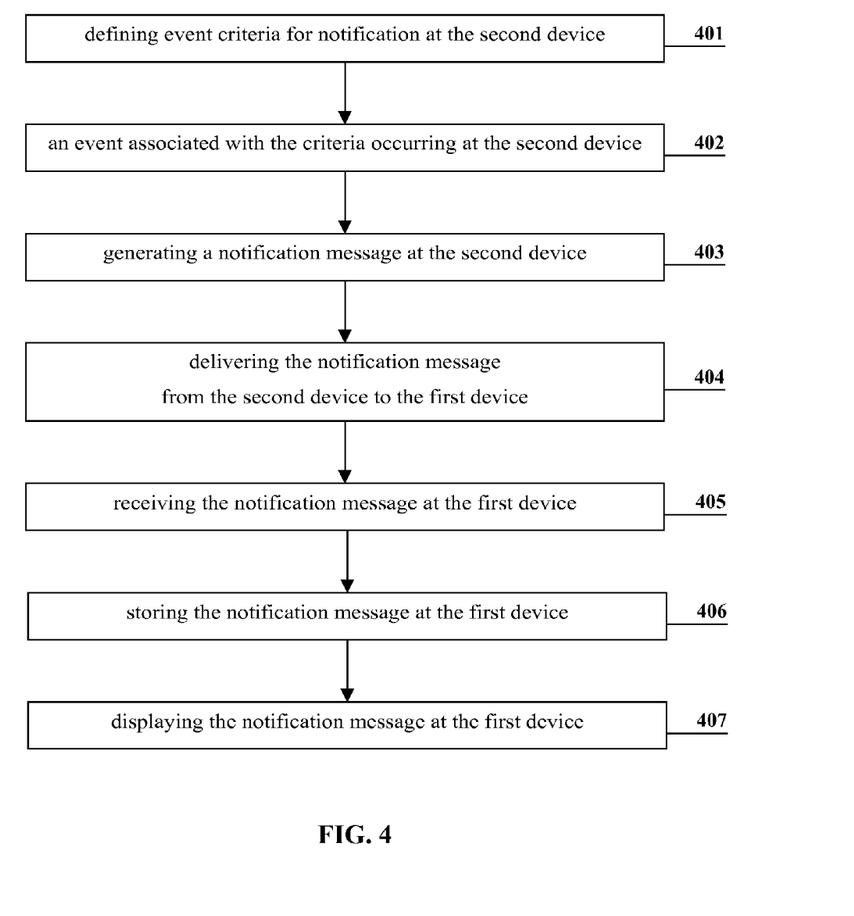
FIG. 4 illustrates a schematic block diagram of an exemplary event and notification, in accordance with one embodiment of the present invention.

Reference is now to FIG. 4, which illustrates a schematic block diagram of an exemplary event and notification. In one embodiment, the communication device 201 from FIG. 2 is denoted herein as the first device, and the communication device 202 from FIG. 2 is denoted herein as the second device.

In the block 401, event criteria for notification are setup at the second device. The events can be the state changes of device, hardware components, firmware modules and software modules, such as being started, being stopped, being installed, being uninstalled, being enabled, being disabled, being activated, being deactivated, being turned on, being turned off, and the like. The events can also be the changes of network reachable identifiers, such as the changes of email addresses, mobile subscriber integrated services digital network (MSISDN) numbers, instant messenger ids, social network ids, session initiation protocol (SIP) addresses, and internet protocol (IP) addresses including internet protocol version 4 (IPv4) address and internet protocol version 6 (IPv6) address. In addition, the event criteria can be contents matching rules, such as email messages, text messages, instant messages, voice call contents, and hypertext transfer protocol (HTTP) data contents matching predefined keywords, voice caller ids matching predefined blacklists, hypertext transfer protocol web site addresses matching predefined categories, device being located in predefined geo-location ranges, and the like. When an event associated with the event criteria occurs at the second device in the block 402, a notification message will be generated at the second device in the block 403, and then sent from the second device to the first device in the block 404 via the communication network 203.

The notification message is received in the block 405, stored in the block 406, and then displayed in the block 407 at the first device.

Likewise, the communication device 201 from FIG. 2 can be acted as the second device in FIG. 3 and FIG. 4, and the communication device 202 from FIG. 2 can be acted as the first device in FIG. 3 and FIG. 4. A request message can be generated at the communication device 202 and then sent from the communication device 202 to the communication device 201 via the communication network 203 in FIG. 3; a response message can be generated at the communication device 201 and then sent from the communication device 201 to the communication device 202 via the communication network 203 in FIG. 3. In addition, a notification message can be generated at the communication device 201 and then sent from the communication device 201 to the communication device 202 via the communication network 203 in FIG. 4.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method providing peer-to-peer device management, monitor and control with a first communication device, a second communication device, and a communication network connecting said first communication device and said second communication device, where the first communication device can manage, monitor and control the second communication device, and the second communication device can manage, monitor and control the first communication device, the method comprising the acts of:

negotiating and agreeing on keys for message encryption and message decryption with credentials from zero or more trusted authorities, and/or said first communication device, and/or said second communication device;

generating a request message with commands to manage, monitor and control said second communication device at said first communication device;

encrypting said request message with said keys at said first communication device;

delivering said request message from said first communication device to said second communication device via said communication network;

receiving and storing said request message at said second communication device;

decrypting said request message with said keys at said second communication device;

executing the commands in said request message at said second communication device;

generating a response message with result and status to said request message at said second communication device;

encrypting said response message with said keys at said second communication device;

delivering said response message from said second communication device to said first communication device via said communication network; receiving and storing said response message at said first communication device;

decrypting said response message with said keys at said first communication device;

displaying said result and status in said response message at said first communication device; and wherein said second communication device is configured to generate additional request messages to manage, monitor and control said first communication device, send said additional request messages from said second communication device to said first communication device via said communication network; and said first communication device is configured to generate additional response messages to said additional request messages with result and status, send said additional response messages from said first communication device to said second communication device via said communication network to be displayed at said second communication device;

wherein said first communication device and said second communication device are configured to manage, monitor and control each other, perform actions against each other for peer-to-peer device management, monitor and control, and be in both managing-monitoring-controlling role and managed-monitored-controlled role;

wherein said commands comprise one or more commands selected from the group consisting of all of the following:

retrieving device information comprising one or more selected from the group consisting of all of the following manufacture, model, central processing units, system memories, disk storages operating systems, input interfaces or components, output interfaces or components, network interfaces or components, and network reachable identifiers;

retrieving and/or monitoring current and/or historical statistical reports of one or more selected from the group consisting of all of the following: CPU, memory, disk, and process usages; retrieving and/or monitoring current and/or historical locations;

retrieving and/or monitoring current and/or historical internet protocol (IP) data packets comprising one or more selected from the group consisting of all of the following: email messages, instant messages, and hypertext transfer protocol (HTTP) contents if internet service, and/or Wi-Fi service, and/or data service are supported and subscribed;

retrieving and/or monitoring current and/or historical voice call contents if voice service is supported subscribed;

retrieving and/or monitoring current and/or historical video contents if video service is supported and subscribed;

retrieving and/or monitoring current and/or historical SMS text messages if short message service (SMS) is supported and subscribed;

retrieving and/or monitoring current and/or historical MMS messages if multimedia messaging service (MMS) is supported and subscribed;

retrieving and/or monitoring current and/or historical SIP messages if session initiation protocol (SIP) service is supported and subscribed;

retrieving and/or monitoring current and/or historical Bluetooth messages if Bluetooth protocol is supported and enabled;

retrieving and/or monitoring current and/or historical NFC messages if near field communication (NFC) is supported and enabled;

retrieving list of hardware components, firmware modules and software modules;

retrieving parameter names and values of one or more selected from the group consisting of all of the following: configurations, profiles, policies and settings about device, hardware components, firmware modules and software modules; modifying parameter names and values of one or more selected from the group consisting of al of the following: configurations, profiles, policies, and settings about device, hardware components, firmware modules and software modules;

perform one or more actions selected from the group consisting of all of the following: installing, uninstalling, enabling, disabling, activating, deactivating, starting, stopping, turning on and turning off hardware components, firmware modules and software modules;

locking a device;

unlocking a device; and resetting a device back to factory default.

2. The method as claimed in claim 1, further comprising the acts of:

generating a notification message for peer-to-peer device management, monitor and control when events for notification occur at said second communication device;

delivering said notification message from said second communication device to said first communication device via said communication network;

receiving and storing said notification message at said first communication device;

displaying said notification message at said first communication device; and wherein said first communication device is configured for generating additional notification messages for peer-to-peer device management, monitor and control, sending said additional notification messages from said first communication device to said second communication device via said communication network and wherein said second communication device is configured to display aid additional notification messages;

wherein said events for notification comprises one or more events selected from the group consisting of all of the following:
  monitored text messages matching predefined keywords or rules;
  monitored text message senders matching predefined blacklists or rules;
  monitored email messes matching predefined keywords or rules;
  monitored email message senders matching predefined blacklists or rules;
  monitored instant messages matching predefined keywords or rules;
  monitored instant message senders matching predefined blacklists or rules;
  monitored multimedia messes matching predefined keywords or rules;
  monitored multimedia message senders matching predefined blacklists or rules;
  monitored session initiation protocol messages matching predefined keywords or rules;
  monitored session initiation protocol message senders matching predefined blacklists or rules;
  monitored Bluetooth messages matching predefined keywords or rules;
  monitored near field communication messages matching predefined keywords or rules;
  monitored voice call contents matching predefined keywords or rules;
  monitored voice caller ids matching predefined blacklists or rules;
  monitored video contents matching predefined keywords, categories or rules;
    monitored video content senders matching predefined blacklists or rules;
  monitored hypertext transfer protocol contents matching predefined keywords or rules;
  monitored hypertext transfer protocol web site addresses matching predefined categories or rules;
  state changes of one or more selected from the group consisting of all of the following: device, hardware components, firmware modules, and software modules, wherein said state changes comprise one or more selected from the group consisting of all of the following:
    being started, being stopped, being enabled, being disabled, being activated, being deactivated, being installed, being uninstalled, being turned on, and being turned off;
  changes of said network reachable identifiers; and
  device being located in predefined geo-location ranges.

3. A system providing peer-to-per device management monitor and control, the system comprising:
  a first communication device;
  a second communication device;
  a communication network connecting said first communication device and said second communication device; and the system performing the acts of:
  negotiating and agreeing on keys for message encryption and message decryption with credentials from zero or more trusted authorities an/or said first communication device, and/or said second communication device;
  generating a request message with commands to manage, monitor and control said second communication device at said first communication device;
  encrypting said request message with said keys at said first communication device;
  delivering said request message from said first communication device to said second communication device via aid communication network;
  receiving and storing said request message at said second communication device;
  decrypting said request message with said keys at said second communication device;
  executing the commands in said request message at said second communication device;
  generating a response message with result and status to said request message at said second communication device;
  encrypting said response message with said keys at said second communication device;
  delivering said response message from said second communication device to said first communication device via said communication network;
  receiving and storing said response message at said first communication device;
  decrypting said response message with said keys at said first communication device;
  displaying said result and status in said response message at said first communication device; and
  wherein said second communication device is configured to generate additional request messages to manage, monitor and control said first communication device, send said additional request messages from said second communication device to said first communication device via said communication network; and
  said fir communication device is configured to generate additional response messages to said additional request messages with result and status, send said additional response messages from said first communication device to said second communication device via said communication network to be displayed at said second communication device;
  wherein said first communication device and said second communication device are configured to manage, monitor and control each other, perform actions against each other for peer-to-peer device management, monitor and control, and be in both managing-monitoring-controlling role and managed-monitored-controlled role;
  wherein said commands comprise one or more commands selected from the group consisting of all of the following:
    retrieving device information comprising one or more selected from the group consisting of all of the following: manufacture, model, central processing units, system memories disk storages, operating systems, input interfaces or components, output interfaces or components, network interfaces or components, and network reachable identifiers;
    retrieving and/or monitoring current and/or historical statistical reports of one or more selected from the group consisting of all of the following: CPU, memory, disk and process usages;

retrieving and/or monitoring current and/or historical locations;

retrieving and/or monitoring current and/or historical internet protocol (IP) data packets comprising one or more selected from the group consisting of al of the following: email messages, instant messages, and hypertext transfer protocol (HTTP) contents if internet service, and/or Wi-Fi service, and/or data service are supported and subscribed;

retrieving and/or monitoring current and/or historical voice call contents if voice service is supported and subscribed;

retrieving and/or monitoring current and/or historical video contents if video service is supported subscribed;

retrieving and/or monitoring current and/or historical SMS text messages if short message service (SMS) is supported and subscribed;

retrieving and/or monitoring current and/or historical MMS messages if multimedia messaging service (MMS) is supported and subscribed;

retrieving and/or monitoring current and/or historical SIP messages if session initiation protocol (SIP) service is supported and subscribed;

retrieving and/or monitoring current and/or historical Bluetooth messages if Bluetooth protocol is supported and enabled;

retrieving and/or monitoring current and/or historical NFC messages if near field communication (NFC) is supported and enabled;

retrieving list of hardware components, firmware modules and software modules;

retrieving parameter names and values of one or more selected from the group consisting of all of the following: configurations, profiles, policies, and settings about device, hardware components, firmware modules and software modules;

modifying parameter names and values of one or more selected from the group consisting of all of the following: configurations, profiles, policies, and settings about device, hardware components, firmware modules and software modules;

perform one or more actions selected from the group consisting of all of the following: installing, uninstalling, enabling, disabling, activating, deactivating, starting, stopping, turning on and turning off hardware components, firmware modules and software modules;

locking device;

unlocking device; and resetting device back to factory default.

4. The system s claimed in claim 3, further comprising the acts of:

generating a notification message for peer-to-peer device management, monitor and control when events for notification occur at said second communication device;

delivering said notification message from said second communication device to said first communication device via said communication network;

receiving and storing said notification message at said first communication device;

displaying said notification message at said first communication device; and wherein said first communication device is configured for generating additional notification messages for peer-to-peer device management monitor and control, sending said additional notification messages from said first communication device to said second communication device via said communication network and wherein said second communication device is configured to display said additional notification messages;

wherein said events for notification comprises one or more events selected from the group consisting of all of the following:

monitored text messages matching predefined keywords or rule monitored text message senders matching predefined blacklists or rules;

monitored email messages matching predefined keywords or rules;

monitored email message senders matching predefined blacklists or rules;

monitored instant messages matching predefined keywords or rules;

monitored instant message senders matching predefined blacklists or rules;

monitored multimedia messages matching predefined keywords or rules;

monitored multimedia message senders matching predefined blacklists or rules;

monitored session initiation protocol messages matching predefined keywords or rules;

monitored session initiation protocol message senders matching predefined blacklists or rules;

monitored Bluetooth messages matching predefined keywords or rules;

monitored near field communication messages matching predefined keywords or rules;

monitored voice call contents matching predefined keywords or rules;

monitored voice caller ids matching predefined blacklists or rules;

monitored video contents matching predefined keywords, categories or rules;

monitored video content senders matching predefined blacklists or rules;

monitored hypertext transfer protocol contents matching predefined keywords or rules;

monitored hypertext transfer protocol web site addresses matching predefined categories or rules;

state changes of one or more selected from the group consisting of all of the following: device, hardware components, firmware modules, and software modules, wherein said state changes comprise one or more selected from the group consisting of all of the following: being started, being stopped, being enabled, being disabled, being activated, being deactivated, being installed, being uninstalled, being turned on, and being turned off;

changes of said network reachable identifiers; and device being located in predefined geo-location ranges.

* * * * *